April 15, 1941.     H. C. FOSTER     2,238,385
PLUG VALVE
Filed Oct. 14, 1939     2 Sheets-Sheet 1
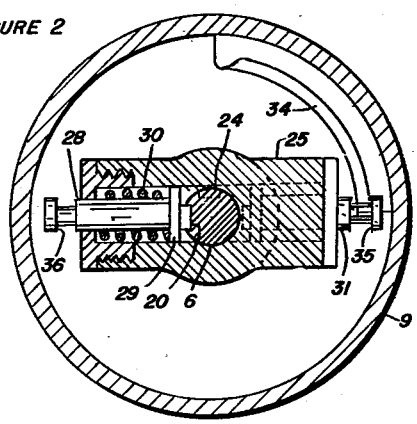
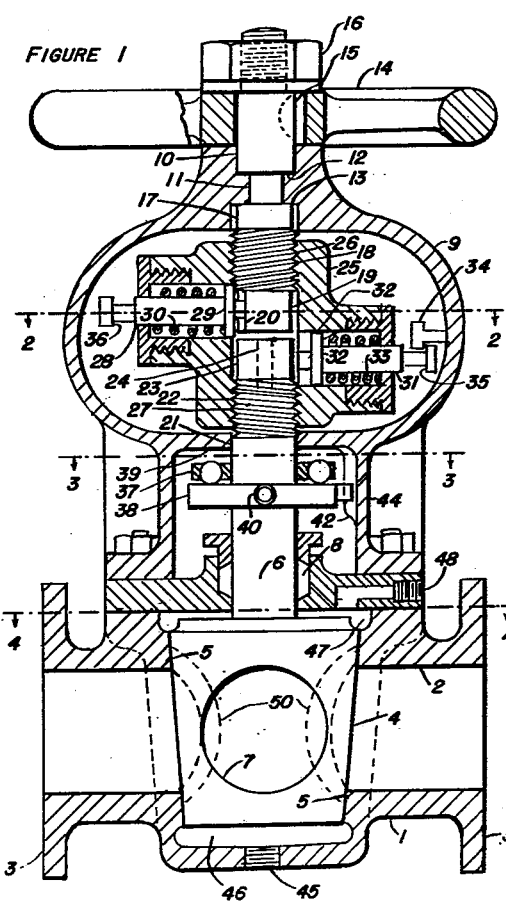
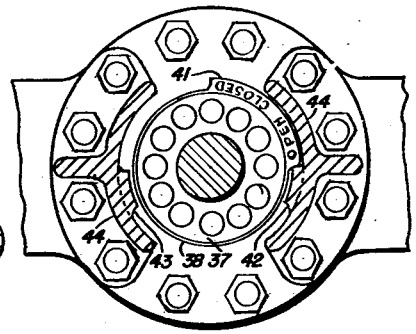
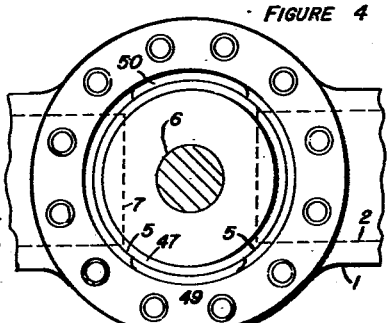
Howard C. Foster
INVENTOR April 15, 1941.  H. C. FOSTER  2,238,385
PLUG VALVE
Filed Oct. 14, 1939   2 Sheets-Sheet 2
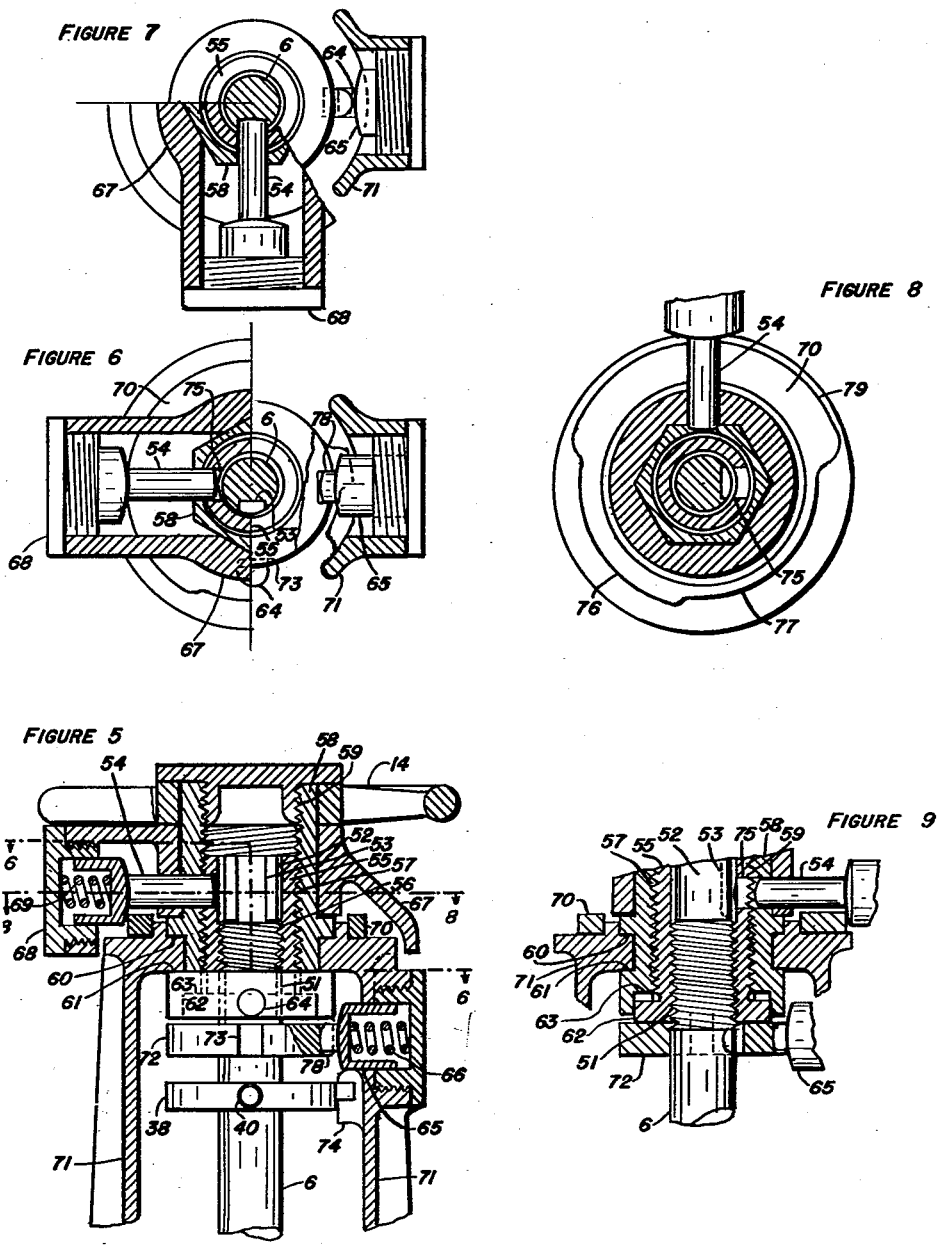
Howard C. Foster
INVENTOR Patented Apr. 15, 1941

2,238,385

UNITED STATES PATENT OFFICE 2,238,385

PLUG VALVE

Howard C. Foster, Los Angeles, Calif., assignor to John C. Batchelor

Application October 14, 1939, Serial No. 299,529

7 Claims. (Cl. 74—22)

My invention relates to improvements in a plug valve, and more particularly to an actuating mechanism therefor.

Particularly in large size plug valves, very substantial forces are frequently required to break the closure member away from its seat because of the natural cohesion between those parts, the pressure exerted by the fluid being controlled and other causes, and it has accordingly become a frequent practice to provide such valves with independent means for first lifting the plug from its seat and a second means for turning the plug while lifted, whereupon the first means may be employed to reseat the plug.

Certain attempts have also been made in the art to combine in a single control means the functions of lifting the plug and turning it in order to facilitate actuation of the valve and to assist in reducing the possibility of human failure because of a careless operator's failure to reseat the plug after rotating it. Devices resulting from these attempts have frequently taken the form of lifting cams which sometimes are caused to function directly by permitting the plug to ride up onto the cam, sometimes by actuating the cams themselves by various arrangements of gearing, and other means. In other instances, a threaded valve stem and a nut thereon have been caused to cooperate to lift the plug by first screwing the valve stem up into the nut, then turning the plug and then returning the plug to its seat by action in the opposite direction of the nut on the stem. This arrangement has necessitated complicated gearing or other actuating mechanism to control the successive operating functions, with the result that valves employing these means have not been completely satisfactory.

In view of these shortcomings of prior valve operating mechanisms, it is a particular object of my invention to provide an improved valve actuating mechanism adapted to successively lift, turn and drop a closure member by the continuous operation in a single direction of a single control member.

This and other objects will be evident upon examination of the description of my invention which follows.

In accordance with my invention I have provided a pair of screw threads, one right-hand and one left-hand, one of which threads may be connected with a valve stem or other member to be controlled, and the other of which may be connected with an actuating member, a mechanical interconnection between the pair of threads and the actuating member for sequentially permitting relative motion between the parts of only the first thread, then permitting relative motion between neither of the threads, and then permitting relative motion between the elements of only the second thread.

In order to describe my invention more fully, attention is directed to the accompanying drawings in which:

Figure 1 is a partially sectional, elevational view of one form which my invention may take;

Figure 2 is a partially sectional plan view of Figure 1 taken on the line 2—2;

Figure 3 is a sectional plan view of Figure 1 taken on the line 3—3;

Figure 4 is a sectional plan view of Figure 1 taken on the line 4—4;

Figure 5 is a partially sectional, elevational view of another form which my invention may take;

Figure 6 is a partially sectional view of Figure 5 taken on the line 6—6;

Figure 7 is a view from the same viewpoint as Figure 6, but after 90 degrees rotation of certain elements;

Figure 8 is a partial sectional view of Figure 5 taken on the line 8—8 after 270 degrees rotation of certain elements;

Figure 9 is a fragmentary, partially sectional, elevational view of Figure 5 after 180 degrees rotation of certain elements.

Referring primarily to Figure 1, and secondarily to Figures 2, 3 and 4, a conventional valve body 1 is provided having a fluid passage 2 and having conventional connecting flanges 3. It is further provided with a tapered plug 4 fitted to the seat 5. A port 7 is provided in the plug 4 which will be coaxial with and will form a part of the fluid passage 2 when the plug 4 is oriented in quadrature with the position in which it is illustrated. An operating stem 6 is integrally connected with the plug 4, and the former extends upwardly through the packing gland 8. Thus, a valve body is provided which may be of conventional design and which has an upwardly extending stem which is adapted to be associated with my actuating mechanism.

The valve actuating mechanism comprises a housing 9 having the actuating stem 10 journaled in the bearing 11 and restrained against axial displacement by the surfaces 12 and 13. The actuating stem 10 is provided on its upper extension with the hand-wheel 14 by which it may readily be rotated. The hand-wheel is secured to the stem by the key 15 and the nut 16. The lower portion 17 of the stem 10 is provided with an external right-hand thread 18 and a further smooth portion 19 extending below the threaded portion and having a longitudinal slot 20 milled therein.

The housing 9 is provided with a bearing 21 adapted to receive an upper extension of stem 6, and the portion of the stem 6 which extends into the housing 9 is provided with an external left-hand thread 22, terminated at its upper extremity by the smooth portion 23 having a longitudinal slot 24 milled therein.

A valve control member 25 is provided having an internal right-hand thread 26 in its upper portion which receives the thread 18 on the stem 10. The member 25 is also provided with an internal left-hand thread 27 in its lower portion which receives the thread 22 on the stem 6.

The control member 25 is provided with an actuating-stem locking pin 28 having a shoulder 29 and being urged inwardly by the spring 30 so as to cause the pin 28 to fall into the slot 20 when the stem 10 is rotated so that the slot 20 falls under the pin 28.

The control member 25 further contains an operating-stem locking pin 31 provided with a shoulder 32 by which the pin 31 is urged inwardly by the spring 33 so that, in the absence of external restraint, the pin 31 will fall into the slot 24 when it is brought into registration therewith.

A pin actuating flange 34 is provided on the housing 9 at approximately its equatorial plane extending through an arc of approximately 90 degrees and is adapted to cooperate with the flange 35 of the pin 31 and the flange 36 of the pin 28, sequentially, to restrain these pins from falling into the slots 24 and 20, respectively, during predetermined periods during the rotation of the control member 25.

The operation of my valve is as follows. As the valve rests in Figure 1, the plug 4 is properly seated, and the valve is in a closed position. To open the valve, the hand-wheel 14 will be rotated in a counter-clockwise direction (when viewed downwardly). When rotation is first started, the pin 28 is in the slot 20 so that the control member 25 is in condition to be rotated with the stem 10. The pin 31, on the other hand, is held away from the stem 6 by virtue of the fact that the flange 35 is riding upon the actuating flange 34, and will continue to do so while the hand-wheel 14 is being rotated through approximately 90 degrees. Thus, relative axial movement will take place between the threads 22 and 27, and inasmuch as the member 25 is restrained against downward movement by the actuating stem 10 and the surface 12, the stem 6 will be drawn upward into the thread 27 and the plug 4 will be lifted from its seat.

After 90 degrees of rotation of the hand-wheel 14 and the control member 25, the pin 31 will approach registration with the slot 24 in the stem 6 and the restraint on the flange 35 exerted by the flange 34 will no longer exist, so that the pin 31 will now be permitted to fall into the slot 24 under the influence of the spring 33. At this point, it will be seen that the member 25 will continue to be held against rotation relative to the stem 10 by the pin 28 in the slot 20, and the pin 31 in the slot 24 now becomes effective to hold the member 25 against rotary motion relative to the stem 6. Accordingly, through the next 90 degrees of rotation of the hand-wheel 14, still in a counter-clockwise direction, rotary motion will be transmitted to the stem 6, and the plug 4 will be rotated until the port 7 is in registration with the fluid passage 2.

After the second 90 degrees of rotation, the flange 36 on the pin 28 will have been rotated through 180 degrees at which point the flange 36 will ride up onto the actuating flange 34 to lift the pin 28 out of the slot 20. From this point on, rotation of the hand-wheel 14 by a further 90 degrees will find the control member 25 restrained from rotary motion relative to the stem 6 by the pin 31 in the slot 24, but relative rotary motion will be permitted between the member 25 and the stem 10. The threads 18—26 between stem 10 and the member 25, being right-handed, will cause the thread 18 to recede from the thread 26, but because the stem 10 will be held against upward axial motion by the surface 13, the member 25 will be forced downward, and with it, the stem 6. By this action, the plug 4 will be moved downward until it is reseated in its seat 5.

Thus, by approximately 270 degrees rotation of the hand-wheel 14, the plug 4 has been first lifted, then rotated, and then reseated. It will now be evident that a similar amount of rotation of the hand-wheel 14 in a clockwise direction will reverse the steps just described and the plug will be lifted, rotated in the opposite direction, and reseated.

It will be evident that my valve may be so constructed that the lifting and reseating operations may be accomplished in any desired angular displacement of the hand-wheel 14 by changing the pitch of the actuating threads and properly coordinating the locations of the locking mechanisms.

It will frequently be desirable to limit the possible extent of upward motion of the plug 4, and to accomplish this limitation, I have provided the thrust bearing 37 adapted to operate between the collar 38 and the under face 39 of the housing 9. The collar 38 is axially adjustable with respect to the stem 6 and may be adjusted so that the bearing 37 will be placed in compression between the collar 38 and the face 39 at the moment the plug 4 has been lifted the desired maximum amount. It will be understood that this point will normally be the point at which the pin 31 falls into the slot 24. After proper adjustment, the collar 38 may be locked in position by the set screw 40.

As may be seen more clearly by interpreting Figure 3 in the light of Figure 1, it is convenient to combine an appropriate stop mechanism with the collar 38 by providing a raised portion 41 on the collar 38 adapted to engage sequentially the bosses 42 and 43 on the cylindrical portion 44 of the housing 9. The cylindrical portion 44, in the embodiment shown, comprises a pair of cylindrical segments so arranged as to permit viewing of only a part of the raised portion 41 at any time, and the words "Open" and "Closed" may be placed on the portion 41 to indicate the condition of the valve at any time.

In a plug valve of the type I have just described, it is frequently desirable to clean the sealing surfaces of the valve and the port in the plug. To accomplish this in my valve I have provided an inlet 45 which provides access for flushing fluid to the chamber 46 formed between the body 1 and the lower portion of the plug 4. A second annular chamber 47 is formed between the upper portion of the plug 4 and the body 1, and an exit orifice 48 is provided to permit removal of the flushing fluid from the chamber 47. As may be seen more clearly in Figure 4, I have provided a pair of channels 49 and 50 in the side portions of the seat 5 which provide communication between the chamber 46 and the chamber 47 at all times; and between the chambers 46 and 47 and the port 7 when the valve is in a closed condition. Thus, by the introduction of a flushing fluid under pressure through the inlet 48, continual flushing of the port 7 and the seating faces of the plug 4 may be accomplished.

In Figure 5, I have shown an actuating mechanism which operates on the same principle as the embodiment of Figure 1, but differs markedly from the embodiment just described. The principle of employing a right-hand and left-hand thread in sequence to raise and lower a valve plug to facilitate its rotation remains precisely the same, however.

In this embodiment, an operating stem 6 is provided near its upper end with a left-hand thread 51 above which is a smooth portion 52 containing a slot 53 adapted to receive the pin 54 when the pin and slot are in registration. Screwed onto the thread 51 is a floating control member 55 having an internal left-hand thread 56 and an external right-hand thread 57. Screwed onto the external right-hand thread 57 is an actuating member 58 having an internal right-hand thread 59 and this member is held against axial displacement by the bearing surfaces 60 and 61. The control member 55 is provided at its lower extremity with a rim 62 adapted to cooperate with the bearing surface 63 of the actuating member 58 to limit the possible upward motion of the control member 55 relative to the actuating member 58. The lower portion of the actuating member 58 is provided with a boss 64 adapted to engage the pin 65 to urge it outwardly against the spring 66 at a predetermined point of rotation of the actuating member 58. Attached to and rotating with the actuating member 58 is the pin carrier 67 to which is attached the pin mechanism 68 including the pin 54 urged inwardly by the spring 69. A cam 70 is rigidly attached to the framework 71 which is in turn attached to the valve body (not shown). Thus, as the pin mechanism 68 is rotated with the actuating member 58 by the hand-wheel 14, the pin 54 will be lifted by various amounts dependent upon the height of the cam 70.

A collar 72 is rigidly attached to the stem 6 and is provided with slots 73 and 78 in its face which are adapted to cooperate with the pin 65 when it is in registration therewith. A second collar 38 is also provided on the stem 6 adapted to cooperate with the boss 74 to serve as a stop mechanism.

The control member 55 is provided with a radial aperture 75 adapted to be entered by the pin 54 at certain points during the rotation of the hand-wheel 14.

The operation of this embodiment of my valve is as follows. With the valve in the closed and seated position, the hand-wheel 14 is rotated in a direction counter-clockwise when viewed downwardly, and with the pin 54 in the position shown in Figures 5 and 6, relative rotation between the actuating member 58 and the control member 55 is prevented. Relative rotation is permitted, however, between the stem 6 and the control member 55 and, the former being restrained against upward movement by the surface 63 and through the actuating member 58 by the surfaces 60 and 61, the stem 6 will be raised into the control member 55 on the threads 51—56. After 90 degrees of such rotation during which lifting occurs, the pin 54 will have come opposite the slot 53 and it will have fallen from the intermediate portion 76 to the low portion 77 of the cam 70 whereupon the pin 54 will fall into the slot 53. In this condition, the actuating member 58, the control member 55 and the stem 6 will be locked together by the pin 54 and the boss 64 will have been brought into engagement with the pin 65 to lift the latter from the slot 78 in the collar 72. Thus, a further 90 degrees of rotation of the hand-wheel 14 will impart a similar 90 degrees of rotation to the stem.

After the second 90 degrees rotation, the boss 64 will have been rotated away from the pin 65 so that the latter will be permitted to fall into the slot 73 in the collar 72 to lock the stem 6 in its newly acquired position; at the same time, the pin 54 will have reached the high portion 79 of the cam 70 so that the pin 54 will be lifted out of the aperture 75 as well as the slot 53. During the lifting operation, however, the upper face of the collar 72 will have been brought into contact with the lower face of the control member 55 so that further relative rotation between the stem 6 and the control member 55 will be prevented. Thus, the remaining element of freedom will lie in the threads 57—59, and relative motion therebetween will urge the control member 55 and the stem 6 downwardly to reseat the valve.

It will be evident that from this point, clockwise rotation of the hand-wheel 14 will reverse the steps just described and will operate to lift, turn in the opposite direction and depress the stem 6.

It will be seen that I have now described two embodiments of my invention differing materially from each other in mechanism, but each embodying the basic principle of my invention. These embodiments well illustrate the fact that many modifications are possible within the spirit of my invention.

I claim as my invention:

1. A fluid control valve actuating mechanism of the type which unseats, turns and reseats a closure member by a single continuous operation of a single actuating device comprising a valve stem having an external screw thread of one direction of procession on its upper portion; an actuating stem coaxial with said vlave stem and having on its lower portion an external screw thread of a direction of procession opposite that of said first thread; an actuating device for imparting continuous rotary motion to said actuating stem; a collar embracing said valve stem and said actuating stem and having internal screw threads cooperating respectively with said screw threads on said valve stem and said actuating stem; means for preventing relative rotation between said collar and one of said stems during one portion of said continuous rotary motion, relative rotation being permitted between said collar and the other of said stems to lift said valve stem toward said actuating stem; means for preventing relative rotation between said collar and both of said stems during a second portion of said continuous rotary motion to rotate said valve stem in the direction of said rotary motion; and means for permitting relative rotation during a third portion of said continuous rotary motion between said collar and the stem between which relative rotation was restrained during said first portion while preventing relative rotation between said collar and the stem between which motion was permitted during said first portion, to lower said valve stem away from said actuating stem.

2. A fluid control valve actuating mechanism of the type which unseats, turns and reseats a closure member by a single continuous operation of a single actuating device comprising: a valve stem having an external screw thread of one direction of procession on its upper portion; a hollow cylindrical actuating member coaxial with and surrounding but spaced from said stem and having an internal screw thread of a direction of procession opposite that of said thread on said stem; an actuating device for imparting continuous rotary motion to said actuating member; a cylindrical sleeve between said stem and said actuating member having an internal thread engaging the thread on said stem and an external thread engaging the thread in said actuating member; means for preventing relative rotation between said sleeve and said actuating member during one portion of said continuous rotary motion, relative rotation being permitted between said sleeve and said stem to lift said stem toward said actuating member; means for preventing relative rotation between said collar, actuating member and stem during a second portion of said continuous rotary motion to rotate said stem in the direction of said rotary motion; and means for permitting relative rotary motion between said sleeve and said actuating member during a third portion of said continuous rotary motion while preventing relative rotary motion between said sleeve and said stem to lower said valve stem away from said actuating member.

3. A fluid control valve actuating mechanism comprising a first pair of screw threads adapted to advance in one longitudinal direction when given one direction of relative rotary motion, a second pair of screw threads adapted to advance in the opposite longitudinal direction when given the same direction of relative rotary motion as that given to said first pair, a rigid coupling memer between one thread of each of said pairs of screw threads adapted to prevent relative rotary motion therebetween, locking means including a radially disposed pin between said coupling member and one of said otherwise uncoupled threads for selectively restraining relative rotary motion between said coupling member and said uncoupled thread, a second locking means including a second radially disposed pin between said coupling member and the remaining otherwise uncoupled thread for selectively restraining relative rotary motion between said coupling member and said other uncoupled thread, and cam means for selectively actuating both of said locking means.

4. A fluid control valve actuating mechanism of the type which unseats, turns and reseats a closure member by a single continuous operation of a single actuating device comprising: a valve stem having an external screw thread of one direction of procession on its upper portion, and a longitudinal pin-receiving slot also on said upper portion; an actuating stem coaxial with said valve stem and having on its lower portion an external screw thread of a direction of procession opposite that of said first thread, and having a longitudinal pin-receiving slot on said lower portion; an actuating device for imparting continuous rotary motion to said actuating stem; a collar embracing said valve stem and said actuating stem and having internal screw threads cooperating respectively with said screw threads on said valve stem and said actuating stem; a radial pin in said collar adapted to engage said longitudinal pin-receiving slot in said actuating stem for preventing relative rotation between said collar and said actuating stem during one portion of said continuous rotary motion, and spring means for urging said pin toward said slot; a second radial pin in said collar adapted to engage said longitudinal pin-receiving slot in said valve stem for preventing relative rotation between said collar and said valve stem during another portion of said continuous rotary motion, and spring means for urging said second pin toward said slot in said stem; and means for sequentially permitting said pins to engage said slots.

5. A fluid control valve actuating mechanism of the type which unseats, turns and reseats a closure member by a single continuous operation of a single actuating device comprising: a valve stem having an external screw thread of one direction of procession on its upper portion, and also having a radial pin-receiving aperture on its upper portion; a hollow cylindrical actuating member coaxial with and surrounding but spaced from said stem and having an internal screw thread of a direction of procession opposite that of said thread on said stem; an actuating device for imparting continuous rotary motion to said actuating member; a cylindrical sleeve between said stem and said actuating member having an internal thread engaging the thread on said stem and an external thread engaging the thread in said actuating member, and having a radial pin-receiving aperture longitudinally coincident with but radially displaceable from said pin-receiving aperture in said valve stem; a radial pin means carried by said actuating device and adapted selectively to engage said pin-receiving apertures in said cylindrical sleeve and said valve stem to prevent relative rotary motion between said sleeve and stem during one portion of said continuous rotary motion and to permit relative rotary motion between said sleeve and said stem during another portion of said continuous rotary motion; and a second radial pin means for restraining rotary motion of said valve stem during a third portion of said continuous rotary motion.

6. A fluid control valve actuating mechanism of the type which unseats, turns and reseats a closure member by a single continuous operation of a single actuating device comprising: a valve stem having an external screw thread of one direction of procession on its upper portion, and a longitudinal pin-receiving slot also on said upper portion; an actuating stem coaxial with said valve stem and having on its lower portion an external screw thread of a direction of procession opposite that of said first thread, and also having a longitudinal pin-receiving slot on said lower portion; an actuating device for imparting continuous rotary motion to said actuating stem; a collar embracing said valve stem and said actuating stem and having internal screw threads cooperating respectively with said screw threads on said valve stem and said actuating stem; a radial pin in said collar adapted to engage said longitudinal pin-receiving slot in said actuating stem for preventing relative rotation between said collar and said actuating stem; a second radial pin in said collar adapted to engage said longitudinal pin-receiving slot in said valve stem for preventing relative rotation between said collar and said valve stem; cam means for disengaging one of said radial pins from its respective slot during a first portion of said continuous rotary motion; and a second cam means for disengaging the other of said pins from its respective slot during a third portion of said continuous rotary motion, both of said pins being permitted to remain engaged in their respective slots during a second portion of said continuous rotary motion.

7. A fluid control valve actuating mechanism of the type which unseats, turns and reseats a closure member by a single continuous operation of a single actuating device comprising: a valve stem having an external screw thread of one direction of procession on its upper portion, and also having a radial pin-receiving aperture on its upper portion; a hollow cylindrical actuating member coaxial with and surrounding but spaced from said stem and having an internal screw thread of a direction of procession opposite that of said thread on said stem; an actuating device for imparting continuous rotary motion to said actuating member; a cylindrical sleeve between said stem and said actuating member having an internal thread engaging the thread on said stem and an external thread engaging the thread in said actuating member, and having a radial pin-receiving aperture longitudinally coincident with but radially displaceable from said pin-receiving aperture in said valve stem; a radial pin means carried by said actuating device and adapted selectively to engage said pin-receiving apertures in said cylindrical sleeve and said valve stem; second radial pin means for restraining rotary motion of said valve stem; and a plurality of cams for selectively actuating said radial pin means.

HOWARD C. FOSTER.